United States Patent
Tsutsumi

Patent Number: 6,078,971
Date of Patent: Jun. 20, 2000

[54] INPUT/OUTPUT BUFFER AND METHOD FOR INVALIDATING TRANSFERRED DATA IN DIRECT MEMORY ACCESS TRANSFER

[75] Inventor: Yasunori Tsutsumi, Tokyo, Japan

[73] Assignee: NEC Corporation, Tokyo, Japan

[21] Appl. No.: 08/761,751

[22] Filed: Dec. 5, 1996

[30] Foreign Application Priority Data

Dec. 7, 1995 [JP] Japan ................................ 7-318878

[51] Int. Cl.[7] ........................................ G06F 13/28
[52] U.S. Cl. ........................ 710/26; 710/24; 710/22; 710/55
[58] Field of Search ...................... 395/846, 844; 386/99; 345/511; 341/107; 711/143; 710/55, 26, 24, 22

[56] References Cited

U.S. PATENT DOCUMENTS

| | | | |
|---|---|---|---|
| 4,961,116 | 10/1990 | Kanamaru et al. | 386/99 |
| 5,109,501 | 4/1992 | Kaneko et al. | 395/846 |
| 5,155,830 | 10/1992 | Kurashige | 395/844 |
| 5,247,648 | 9/1993 | Watkins | 711/143 |
| 5,268,686 | 12/1993 | Battail | 341/107 |
| 5,559,952 | 9/1996 | Fujimoto | 345/511 |
| 5,748,249 | 5/1998 | Fujiwara | 348/419 |

FOREIGN PATENT DOCUMENTS

| | | |
|---|---|---|
| 2-112039 | 4/1990 | Japan. |
| 2110646 | 4/1990 | Japan. |

OTHER PUBLICATIONS

Copy of Japanese Office Action with translation.

Primary Examiner—Zarni Maung
Assistant Examiner—Philip B. Tran
Attorney, Agent, or Firm—McGinn & Gibb, P.C.

[57] ABSTRACT

An input/output (I/O) buffer has a block-end detector which detects that an access has reached the last word in a block of the I/O buffer. If the block-end detector detects the last word of the block, then the block is invalidated. The I/O buffer also has a direct-memory-access-end detector which detects that an access has reached the last word in a direct-memory-access (DMA) transfer. If the DMA-end detector detects the last word of the DMA transfer, then the block is invalidated. The I/O buffer may also have a configuration memory which stores configuration information concerning whether a DMA controller accesses the input/output buffer instead of a storage. If the configuration information indicates that the DMA controller does not access the input/output buffer, then data from the storage are bypassed to the DMA controller.

14 Claims, 3 Drawing Sheets

INPUT/OUTPUT BUFFER AND METHOD FOR INVALIDATING TRANSFERRED DATA IN DIRECT MEMORY ACCESS TRANSFER

BACKGROUND OF THE INVENTION

The present invention relates to an input/output buffer, and more particularly to an input/output buffer for prefetching data in a direct memory access transfer.

In direct memory access (DMA) transfer, data are transferred between a storage and input/output (I/O) device without intervention by a processor. In the DMA transfer, data from the storage are temporarily buffered in an I/O buffer in order to improve data transfer performance.

The conventional I/O buffer has a tag memory for storing address tags and a data memory for storing corresponding data, similarly to the structure of a cache memory. A cache memory utilizes the principle of locality. This principle has two dimensions, i.e., time and space. Temporal locality assumes that if an item is referenced, it will tend to be referenced again soon. Spatial locality assumes that if an item is referenced, nearby items also will tend to be referenced soon.

In the DMA transfer, however, since data are sequentially transferred, an access may not be repeatedly made to the same data. In other words, when data which have been read from a storage and written in an I/O buffer are read once by a DMA controller, the data may not be accessed again. Therefore, if the same protocol with that of a cache memory is adopted in an I/O buffer, the I/O buffer may be filled with unnecessary blocks. Further, if the data with respect to the different DMA transfers exist in the same I/O buffer, the I/O buffer not only cannot be effectively used, but also coherency of the data cannot be assured.

SUMMARY OF THE INVENTION

In view of the foregoing problem of the conventional system, an object of the present invention is to improve data transfer performance by controlling the system so as not to hold data with respect to the DMA transfer unnecessarily.

It is another object of the present invention to assure coherency between the DMA transfers by controlling the system so as not to simultaneously buffer data each with respect to different DMA transfers.

In a buffer according to a first aspect of the present invention, the buffer stores data transferred from a storage to a reader. The buffer has a detector and an invalidator. The detector detects an end of data transfer in a block of the buffer. The invalidator invalidates the block in which the detector detects the data transfer end.

With the unique and unobvious structure of the present invention, data transfer performance is improved, the I/O buffer is effectively and efficiently used, and data coherency is assured.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

An input/output (I/O) buffer in accordance with a preferred embodiment of the present invention will be described in detail with reference to the accompanying drawings.

Figure 1:
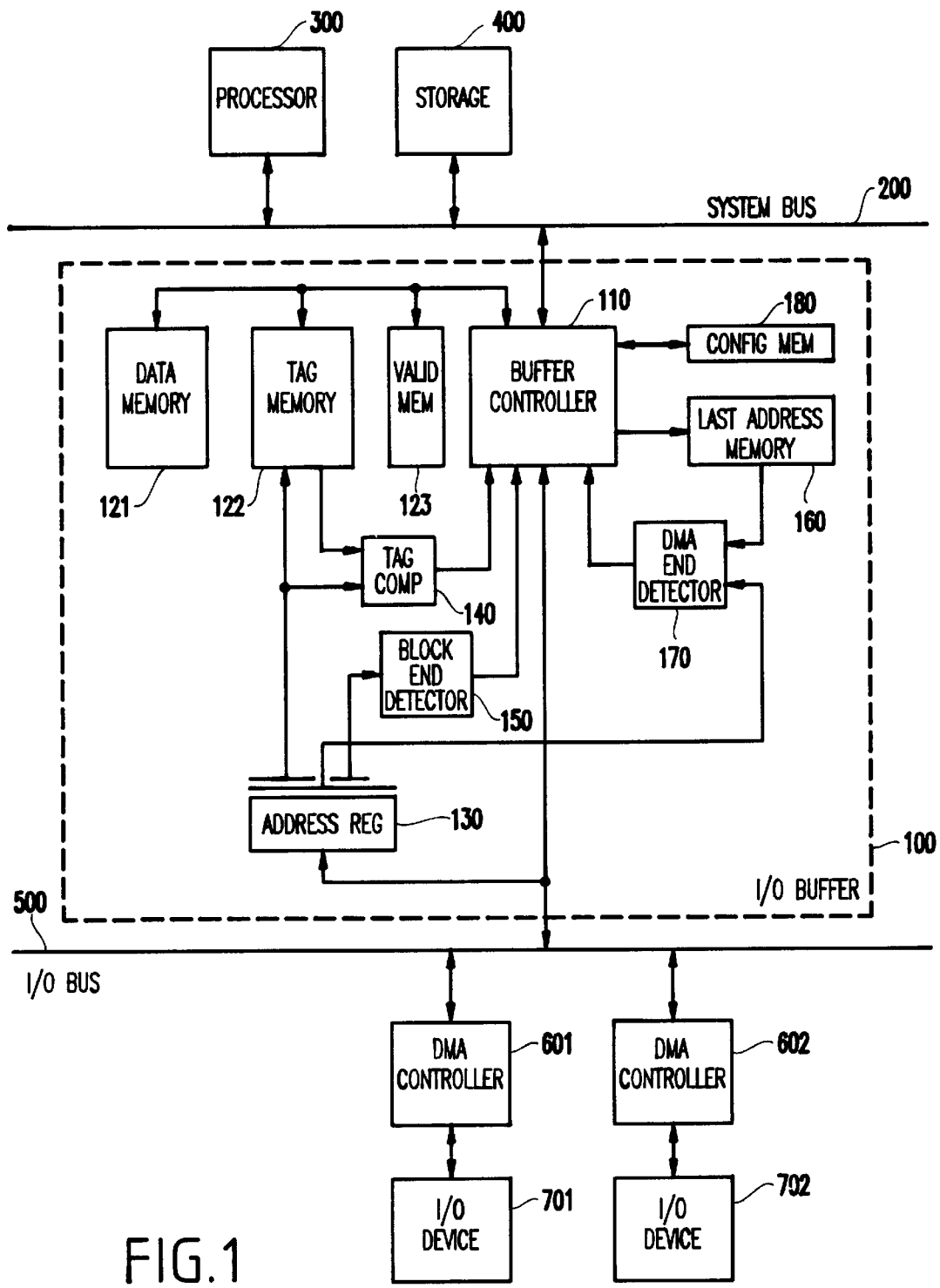
FIG. 1 is a block diagram showing the configuration of an input/output buffer according to an embodiment of the present invention.

Referring to FIG. 1, an I/O buffer 100 is connected between a system bus 200 and an I/O bus 500. A processor 300 for processing data and a storage 400 for storing data as a main memory are connected to the system bus 200. In addition, DMA controllers 601 and 602 are connected to the I/O bus 500. I/O devices 701 and 702 are connected to the DMA controllers 601 and 602, respectively.

The I/O buffer 100 has a data memory 121 for storing data by (e.g., in) a predetermined size block, a tag memory 122 for storing an address tag corresponding with each block, and a valid memory 123 for storing valid bits of each block, similarly to a cache memory.

The I/O buffer 100 also has a last address memory 160 for storing a last address for the DMA transfer, an address latch (register) 130 for holding an address from the I/O bus 500, a tag comparator 140 for comparing an upper portion of an address held in the address latch 130 with an address stored in the tag memory 122, a block-end detector 150 for detecting that the access has reached the last address in the block from a lower portion of the address held in the address latch 130, and a DMA-end detector 170 for comparing the entire address held in the address latch 130 with the address stored in the last address memory 160. The I/O buffer 100 also has a configuration memory 180 for storing configuration information of the DMA controllers 601 and 602.

Figure 2:
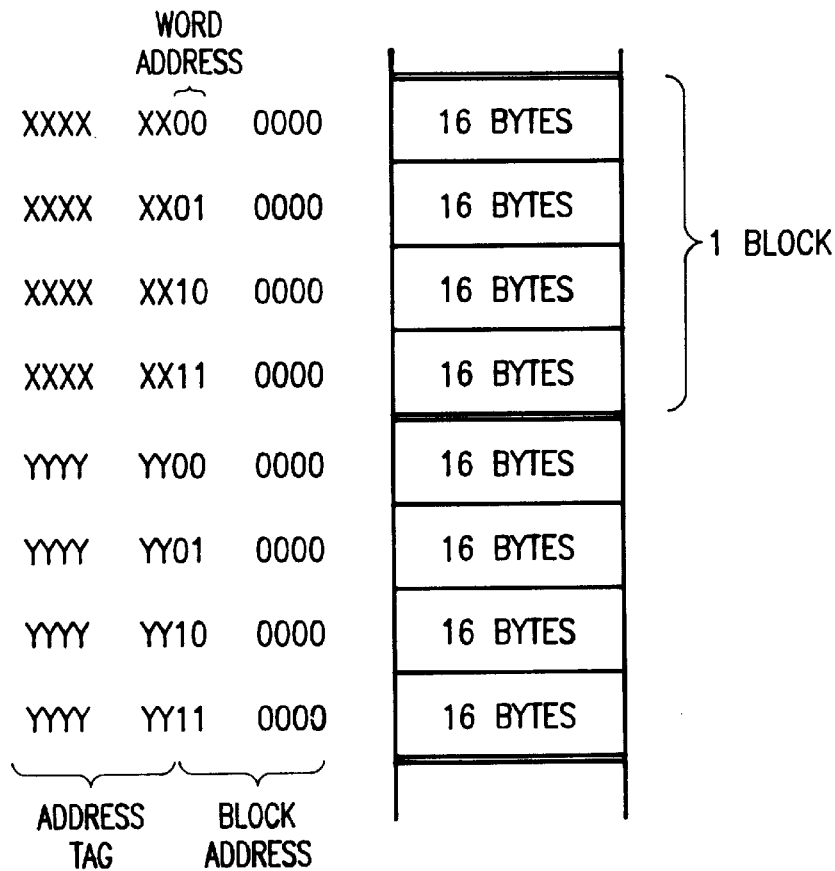
FIG. 2 is a view for explaining the addressing for the block management in the embodiment according to the present invention.

Referring to FIG. 2, for example, each block in the data memory 121 has 64 bytes. Data transfer between the storage 400 and the system bus 200 is performed by (in) a 64-byte block. Meanwhile, regarding an access from the DMA controllers 601 and 602, 16 bytes are a unit for one word. When an access is made every 16 bytes from the beginning of the block, four accesses are made to one block.

Looking at the address in greater detail, the lower 4 bits are all "0", and fifth and sixth bits from the least-significant bits (e.g., from the lower bits) indicate a word address in a block, as shown in FIG. 2. The lower 6 bits are referred to as an address in a block ("block address"). Further, the upper bits other than the address in a block are referred to as an "address tag". It is assumed that all the accesses from the DMA controllers 601 and 602 are aligned on the 16-byte boundary.

Figure 3:
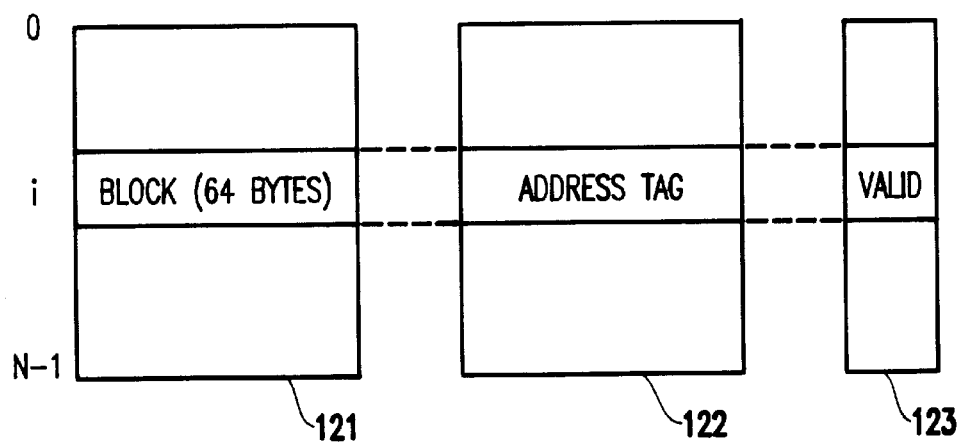
FIG. 3 is a view for explaining correspondence among a data memory 121, a tag memory 122, and a valid memory 123 in the embodiment according to the present invention.

Referring to FIG. 3, the data memory 121, the tag memory 122 and the valid memory 123 respectively have "N" (where N is at least one) entries addressed from "0" to "N−1", and the entries correspond with each other. Data of one block are stored in one entry of the data memory 121. That is, data of an "i"-th entry of the data memory 121 are related to an address tag stored in an "i"-th entry of the tag memory 122. Although it is assumed that the structure is similar to the full-associative structure of the cache memory for the brief explanation of the embodiment, any other structure such as a set-associative structure or a direct-map structure also may be used.

Figure 4:
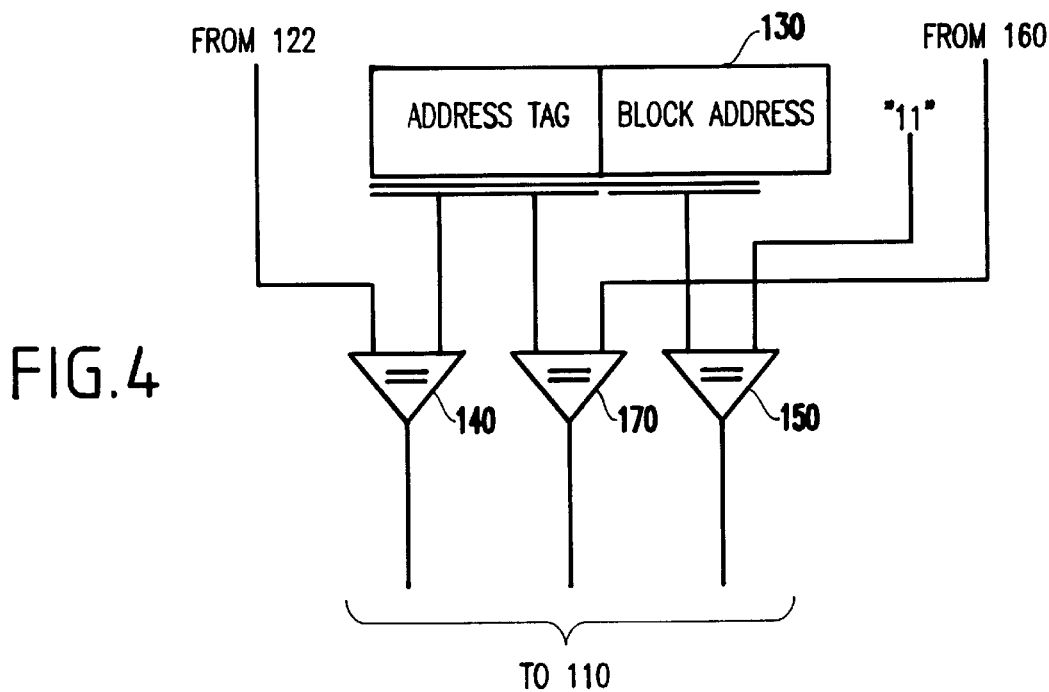
FIG. 4 is a block diagram showing a circuit for comparing addresses in the embodiment according to the present invention.

Referring to FIG. 4, the tag comparator 140 detects whether an address tag held in the address latch 130 coincides with an address held in any entry of the tag memory 122. The tag comparator 140 therefore has "N" address comparators. The detection of the coincidence by the tag comparator 140 is referred to as a "hit", while no detection of the coincidence is referred to as a "miss" or a "miss-hit". However, when the corresponding entry of the valid memory 123 does not represent a "valid" entry, the detection is regarded as a "miss-hit". When a "hit" occurs, the buffer controller 110 reads data of the corresponding entry from the data memory and transfers the data to the I/O bus 500.

The block-end detector 150 judges whether the 2-bit word address in a block in the address latch 130 is "11". If the word address is "11", it means that an access has been made to the last 16-byte word (e.g., unit) in the block. If the word address is "11", the buffer controller 110 "invalidates" the corresponding entry of the valid memory 123. The block-end detector 150 can be implemented by, for example, an AND circuit.

The DMA-end detector 170 detects whether the address held in the address latch 130 coincides with the address held in any entry in the last address memory 160. The coincidence of the addresses means that the last address is for the DMA transfer. When the coincidence is detected, the buffer controller 110 invalidates the corresponding block if that block exists in the data memory 121. In other words, the entry in the valid memory 123 corresponding with the entry having the address whose coincidence was detected by the tag comparator 140 is "invalidated".

The last address memory 160 has M (where M is at least one) entries of a last address. The DMA-end detector 170 therefore has M address comparators. A number of entries in the last address memory 160 corresponds to a number of the DMA transfers which can be simultaneously registered. The number M of entries in the last address memory 160 is not necessarily equal to the number N of entries in the data memory 121, but of course it may be equal.

A last address is registered in the last address memory 160 when the DMA transfer starts. At the start of the DMA transfer, the processor 300 confirms the state of the DMA transfer (e.g., a DMA termination state indicating that the DMA transfer has been terminated, a DMA abnormal termination state indicating that the DMA transfer has been abnormally terminated, and a DMA acceptable state indicating that the DMA transfer request is acceptable). When the DMA transfer is possible, the processor 300 issues a DMA transfer command specifying an operation mode (e.g., write to the storage, read from the storage, etc.), a transfer start address, an amount of data to be transferred, etc.

The control circuit 110 calculates a last address of the transfer by adding the transfer start address to the amount of the data to be transferred which are specified at the start of the DMA transfer, and registers the result in a free entry (space) in the last address memory 160. If there is no free entry available, an appropriate entry is replaced. The appropriate entry can be determined using, for example, a Least-Recently-Used (LRU) algorithm, similarly to the cache memory.

Referring to FIG. 1, the configuration memory 180 stores the configuration information concerning whether the DMA controllers 601 and 602 use the I/O buffer 100 if available.

If the configuration information stored in the configuration memory 180 indicates that the DMA controller 601 does not use the I/O buffer 100 (e.g., does not access the data memory 121), then the buffer controller 110 bypasses data from the storage 400 to the DMA controller 601. For example, the I/O buffer 100 may be fixedly specified as always being bypassed from the DMA controller 601 to make a direct access to the storage 400. This is specified by considering the device characteristics and designer's requirements.

On the other hand, the I/O buffer 100 may be specified as being used every time the DMA transfer command is issued. For example, the I/O buffer 100 may be specified as being used in response to a certain command and the I/O buffer 100 is not used in response to any other command even if the command is a DMA transfer command for directing transfer to the DMA controller 602. This is specified, for example, by considering the amount of data in the DMA transfer.

The DMA controllers 601 and 602 have a signal for requesting use of the buffer as a control signal to the buffer controller 110, and the signal informs the buffer controller 110 by the control signal of requesting use of the I/O buffer 100.

Hereinbelow and referring to FIGS. 1 and 5, the operation of the I/O buffer in accordance with the above-mentioned embodiment of the present invention will be described.

Figure 5:
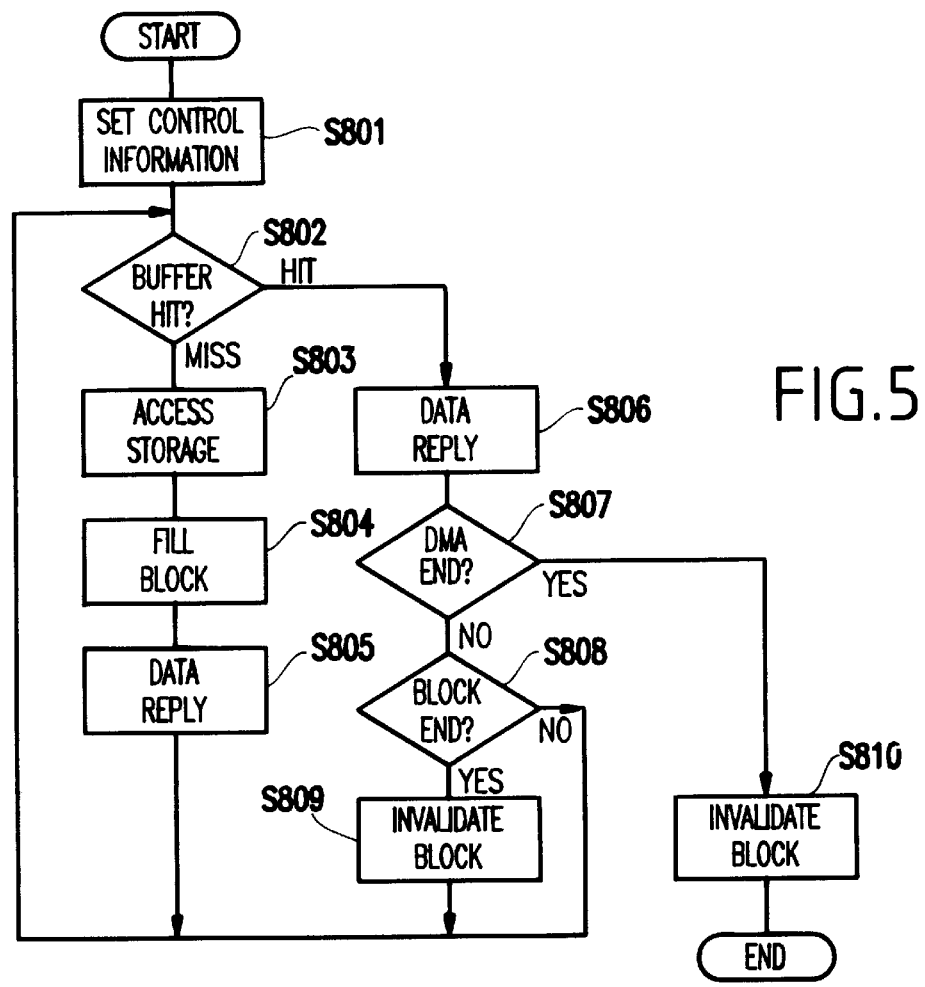
FIG. 5 is a flow-chart showing the operation of the input/output buffer of the embodiment according to the present invention.

Referring to FIGS. 1 and 5, when the DMA transfer command is issued from the processor 300, the buffer controller 110 calculates a last address of the transfer from the transfer start address and an amount of the transfer data that are specified at the start of the DMA transfer, and registers the result in the last address memory 160 (step S801).

If the DMA transfer is a transfer to the DMA controller 601, the DMA controller 601 transfers the data in 16-byte words. In this case, since the DMA controller 601 uses the I/O buffer 100, the signal for requesting use of the I/O buffer 100 is active.

When an access from the DMA controller 601 is a "miss" in the I/O buffer 100 (step S802), the buffer controller 110 accesses the storage 400 to read the necessary data (step S803). The buffer controller then registers the 64-byte block data corresponding to one line in the data memory 121, the tag memory 122 and the valid memory 123 (step S804), and returns the requested 16-byte data to the DMA controller 601 (step S805).

When the access from the DMA controller 601 is a "hit" in the I/O buffer 100 (step S802), the buffer controller 110 returns the requested 16-byte data to the DMA controller 601 (step S806). When the DMA-end detector 170 detects that the current data (e.g., last word or unit of data) are the last data for the DMA transfer (step S807), the corresponding data are invalidated (step S810).

Further, when the detection of the last data of the DMA transfer is not made at the step S807, the block-end detector 150 checks whether the data are the last data of the block (step S808), and if the last data is detected, the corresponding data are invalidated (step S809).

In this manner, according to the I/O buffer 100, when the block-end detector 150 detects that the data are the last data of the block in the DMA transfer, the block in the I/O buffer 100 is invalidated through the buffer controller 110, and the block that is difficult to be used again does not thereby remain in the I/O buffer 100, thereby realizing an early release (early invalidation or replacement). In addition, since detection of the last data for the DMA transfer by the DMA-end detector 170 involves invalidation of the corresponding block in the I/O buffer 100 through the buffer controller 110, the I/O buffer can be invalidated at the end of the DMA transfer even if an access is not made to the last data of the block.

As is apparent from the above description, according to the present invention, since invalidation is carried out in accordance with each of the used blocks in the DMA transfer, the block that is difficult to be used again does not remain in the I/O buffer (thereby realizing early invalidation), and the I/O buffer can be utilized effectively. Moreover, the I/O buffer can be invalidated at the end of the DMA transfer even though an access is not made to the last data of the block.

While the invention has been described in terms of a preferred embodiment, those skilled in the art will recognize that the invention can be practiced with modification within the spirit and scope of the appended claims.

What is claimed is:

1. An input/output buffer, being connected between a system bus which connects to a storage and an input/output bus which connects to an input/output device, said input/output buffer comprising:
    a data memory for storing data in a block from the system bus;
    a tag memory for storing an address tag corresponding with each block;
    a tag comparator for comparing an accessed address tag included in an accessed address with the address tag stored in said tag memory;
    a block-end detector for detecting that an access by the input/output device has reached a last unit in the block; and
    a buffer controller for invalidating the block in which said detector detects the last word if said tag comparator detects coincidence between the accessed address tag included in the accessed address and the address tag stored in said tag memory.

2. The input/output buffer according to claim 1, said block-end detector comprising an AND gate.

3. The input/output buffer according to claim 1, further comprising:
    a configuration memory for storing configuration information concerning whether the input/output device accesses one of said data memory and the storage, wherein if the configuration information stored in said configuration memory indicates that the input/output device does not access said data memory, then said buffer controller bypasses data from the storage to the input/output device.

4. The input/output buffer according to claim 1, further comprising:
    a direct-memory-access-end detector for detecting that an access by the input/output device has reached a last unit of a direct memory access.

5. The input/output buffer according to claim 1, further comprising:
    a last address memory for storing an address of a last unit of direct memory access transfer; and
    a direct-memory-access-end detector for detecting that an access by the input/output device has reached the address stored in said last address memory.

6. The input/output buffer according to claim 5, further comprising:
    a configuration memory for storing configuration information concerning whether the input/output device accesses one of said data memory and the storage, wherein if the configuration information stored in said configuration memory indicates that the input/output device does not access said data memory, then said buffer controller bypasses data from the storage to the input/output device.

7. A computer system having a processor, a storage, an input/output device, a system bus which connects to the processor and the storage, an input/output bus which connects to the input/output device, and an input/output buffer connected between the system bus and the input/output bus, said input/output buffer comprising:
    a data memory for storing data in a block from the system bus;
    a tag memory for storing an address tag corresponding with each block;
    a tag comparator for comparing an accessed address tag included in an accessed address with the address tag stored in said tag memory;
    a block-end detector for detecting that an access by the input/output device has reached a last access in the block; and
    a buffer controller for invalidating the block in which said detector detects the last unit if said tag comparator detects coincidence between the accessed address tag included in the accessed address and the address tag stored in said tag memory.

8. The computer system according to claim 7, said block-end detector comprising an AND gate.

9. The computer system according to claim 7, said input/output buffer further comprising:
    a configuration memory for storing configuration information concerning whether the input/output device accesses one of said data memory and the storage, wherein if the configuration information stored in said configuration memory indicates that the input/output device does not access said data memory, then said buffer controller bypasses data from the storage to the input/output device.

10. The computer system according to claim 9, wherein said input/output device specifies whether or not said input/output device uses said input/output buffer when said input/output device issues a direct memory access transfer command.

11. The computer system according to claim 7, said input/output buffer further comprising:
    a direct-memory-access-end detector for detecting that an access by the input/output device has reached a last unit of a direct memory access.

12. The computer system according to claim 7, said input/output buffer further comprising:
    a last address memory for storing an address of a last unit of direct memory access transfer; and
    a direct-memory-access-end detector for detecting that an access by the input/output device has reached the address stored in said last address memory.

13. The computer system according to claim 12, said input/output buffer further comprising:
    a configuration memory for storing configuration information concerning whether the input/output device accesses one of said data memory and the storage, wherein if the configuration information stored in said configuration memory indicates that the input/output device does not access said data memory, then said buffer controller bypasses data from the storage to the input/output device.

14. A method of controlling an input/output buffer connected between a system bus which connects to a storage and an input/output bus which connects to an input/output device, said method comprising:

determining whether data with respect to direct memory access transfer is stored in a block of the input/output buffer;

determining whether the data with respect to said direct memory access transfer comprises a last unit of the block;

invalidating the block if the data is stored in the block and comprises the last unit of the block;

determining whether the data with respect to said direct memory access transfer comprises a last unit of the direct memory access;

invalidating the block if the data is stored in the block and comprises the last unit of the direct memory access;

registering configuration information concerning whether the input/output device accesses one of the input/output buffer and the storage; and bypassing the input/output buffer if the configuration information indicates that the input/output device does not access the input/output buffer.

* * * * *